(12) United States Patent
Hadj-Sassi et al.

(10) Patent No.: US 8,571,842 B2
(45) Date of Patent: Oct. 29, 2013

(54) METHOD OF DETERMINING PARAMETER FROM SPARSE MEASUREMENT DATA

(75) Inventors: Khaled Hadj-Sassi, Al-Khobar (SA); Jean-Marc Donadille, Al-Khobar (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 534 days.

(21) Appl. No.: 12/819,313

(22) Filed: Jun. 21, 2010

(65) Prior Publication Data

US 2011/0313737 A1    Dec. 22, 2011

(51) Int. Cl.
*G06G 7/48* (2006.01)

(52) U.S. Cl.
USPC .......................................................... 703/10

(58) Field of Classification Search
USPC ................... 703/2, 10; 166/369; 702/2, 6, 16; 367/73; 324/303
See application file for complete search history.

(56) References Cited

U.S. PATENT DOCUMENTS

| | | | |
|---|---|---|---|
| 6,236,943 B1 * | 5/2001 | Aminzadeh et al. ............ | 702/16 |
| 6,502,037 B1 | 12/2002 | Jorgensen et al. | |
| 7,254,091 B1 * | 8/2007 | Gunning et al. ................ | 367/73 |
| 2002/0120429 A1 * | 8/2002 | Ortoleva .......................... | 703/2 |
| 2003/0220739 A1 * | 11/2003 | Feldman et al. ................. | 702/2 |
| 2006/0055403 A1 * | 3/2006 | Freedman ...................... | 324/303 |
| 2009/0164186 A1 * | 6/2009 | Haase et al. ..................... | 703/10 |
| 2009/0306895 A1 * | 12/2009 | MacGregor et al. ............. | 702/6 |
| 2010/0185422 A1 * | 7/2010 | Hoversten ........................ | 703/2 |
| 2012/0080197 A1 * | 4/2012 | Dickens et al. ................. | 166/369 |

OTHER PUBLICATIONS

Colombo et al., "Geophysical modeling via simultaneous joint inversion of seismic, gravity, and electromagnetic data: Application to prestack depth imaging," The Leading Edge, Mar. 2007: pp. 326-331.
Green, "Inversion of Gravity Profiles by Use of a Backus-Gilbert Approach," Geophysics, Oct. 1975, vol. 40(5): pp. 763-772.
Hu et al., "Joint Inversion Algorithm for Electromagnetic and Seismic Data," SEG/San Antonio Annual Meeting, 2007: pp. 1745-1749.
Last et al., "Compact gravity inversion," Geophysics, Jun. 1983, vol. 48(6): pp. 713-721.
Li et al., "3-D inversion of magnetic data," Geophysics, Mar.-Apr. 1996, vol. 61(2): pp. 394-408.
Mosegaard et al., "Probabilistic Approach to Inverse Problems," published as chapter 16 of the International Handbook of Earthquake & Engineering Seismology (Part A), Academic Press: New York, eds: Lee et al., 2002: pp. 1-81 (pp. 237-265 in book).
Li, Y. et al., 3-D inversion of magnetic data, Geophysics, vol. 61, No. 2, Mar.-Apr. 1996, pp. 394-408.
Green, W.R., Inversion of Gravity Profiles by Use of a Backus-Gilbert Approach, Geophysics, vol. 40, No. 5, Oct. 1975, pp. 763-772.

(Continued)

*Primary Examiner* — Kandasamy Thangavelu
(74) *Attorney, Agent, or Firm* — Bridget Laffey; Rachel E. Greene; Jakub Michna

(57) ABSTRACT

A method of simultaneously determining multiple parameters or a parameter distribution characterizing material properties of a volume under investigation using an inversion process of sparse measurements is described including the step of defining an initial model of the volume and modifying the initial model by matching the multiple parameters or parameter distribution with the measurements using alternatingly an iterative inversion method and a probabilistic inversion method, and determining the multiple parameters or parameter distribution after one or more iterations of the alternating inversions.

8 Claims, 1 Drawing Sheet

(56) References Cited

OTHER PUBLICATIONS

Last, B.J., et al., Compact gravity inversion, Geophysics, vol. 48, No. 6, Jun. 1983, pp. 713-721.
Hu, W., et al., Joint Inversion Algorithm for Electromagnetic and Seismic Data, Society of Exploration Geophysicists 2007 Annual Meeting, San Antonio, SEG Expanded Abstracts, pp. 1745-1749.
Colombo, D., et al., Geophysical modeling via simultaneous joint inversion of seismic, gravity and electromagnetic data: Application to prestack depth imaging, The Leading Edge, Mar. 2007, pp. 326-331.
Mosegaard, K., et al., Probabilistic Approach to Inverse Problems, International Handbook of Earthquake & Engineering Seismology (Part A), Academic Press, 2002, pp. 237-265.

* cited by examiner

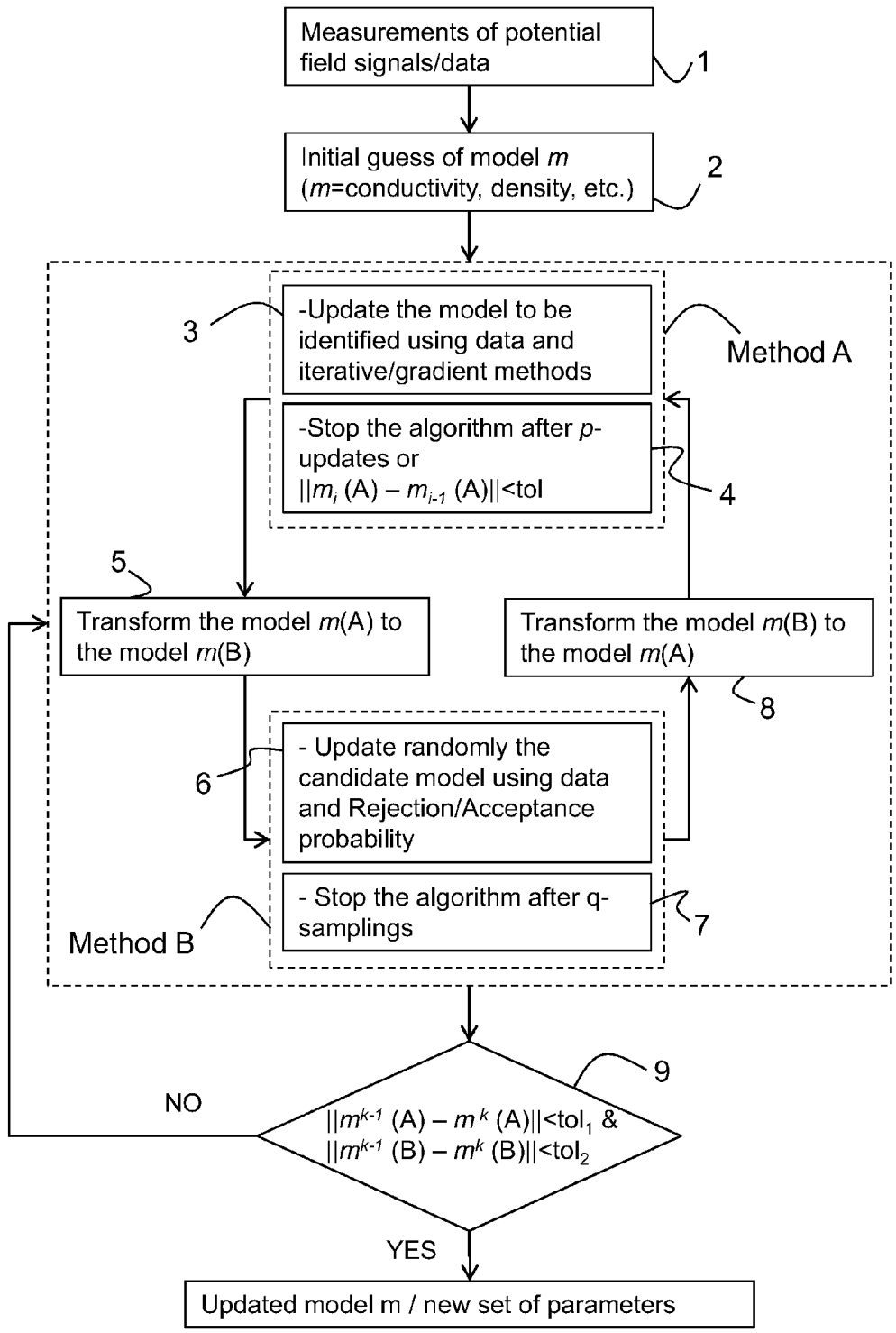

METHOD OF DETERMINING PARAMETER FROM SPARSE MEASUREMENT DATA

FIELD OF THE INVENTION

This invention is generally related to methods of determining parameters from measurements which provide insufficient data for a unique determination of such parameters. More specifically the present invention relates to a method of solving the inverse problem for reservoir related parameters.

BACKGROUND

In the exploration of subterranean reservoirs many reservoir parameters describing for example geology or fluid distributions are not accessible through direct measurement. Instead, these parameters have to be derived simultaneously using typically a plurality of similar measurements combined with mathematical evaluation methods referred to as inversion methods. Given often large number of unknown parameters, the inversion problem generally suffers from being non-unique. Such inversions are known to be ill-posed problem in the Hadamard sense.

Taking for example inverse problems arising from potential field surveys such as gravity, magnetic or electro-magnetic surveys, the ambiguity arises in several ways. The first one is the inherent ambiguity caused by the physics of the problem that permits an infinity of solutions to produce a given potential field data. For example in the case of gravitational surveys, it has been demonstrated that there are infinitely many different distributions of density that reproduce the same set of gravitational field data or measurements.

The second source of ambiguity is the finite number of observed data. In most cases, the amount of data collected is limited and does not contain sufficient information for a unique solution. The inversion problem remains underdetermined.

The third source is the uncertainty of knowledge. In a realistic experiment, the observed data always have experimental uncertainty. Even the physical theories which define the forward modeling, i.e. the generation of a data set from a given set of parameters or model, are often an approximation or idealization of the reality.

The non-uniqueness can be handled by adding other independent information either mathematically based such as regularization functions or geologically- and geophysically-based constraints. Several methods have been developed to better handle inversion problems. These known methods can be broadly split into two main categories: iterative and probabilistic. During the inversion process, typically only one of these two approaches is systematically used.

The different methods that were introduced to add enough a priori information to restrict the solutions within a region of the parameter space that is considered physically reasonable are distinguished by the type of information added to solve the inversion problem. In the first approach the formation is divided into a large number of cells of a finite size. The algorithm produces a solution by minimizing an objective function of the model subject to fitting the data. The model objective function introduces suitable constraints and regularization operators needed to reduce the undesirable models and to control the geometric shape of the solution.

The many published examples of such an approach to solving the inverse problem include Y. Li and Oldenburg, D. W., 3D inversion of magnetic data, Geophysics, 61 (1996), 2, 394-408, who introduce an objective function which incorporates a reference model such that the constructed model keeps close to the reference model. It imposes smoothness in the three spatial directions, and it has a depth weighting designed to distribute the sensitivity according to the distance from the receivers. Others examples like W. R. Green, Inversion of gravity profiles by use of a Backus-Gilbert approach. Geophysics, 40 (1975), 763-772 minimize a weighted model norm with respect to a reference model. This allows guiding the inversion by varying the weighting according to the available information. And B. J. Last and Kubik. K., Compact gravity inversion: Geophysics, 48 (1983), 713-721 minimize the total volume of the causative body in order to maximize the compactness of the estimated model.

The second approach to restrict the solutions within a region of the parameter space attempts to make use of all the available geological, geophysical or logs data in order to penalize models that do not match all given data. The inversion algorithm produces a model that satisfies simultaneously the available information. For example U.S. Pat. No. 6,502,037(B1) to Jorgensen et al introduces techniques to correct the density model using density logs and seismic data. The density logs serve essentially to select better initial guess of density model. And W. Hu, Abubakar, A. and Habashy, T., Joint inversion algorithm for electromagnetic and seismic data, SEG Expanded Abstracts 26, 1745, San Antonio (2007) present an inversion strategy for reservoir properties identification by using simultaneously cross-well EM and cross-well seismic observation. D. Colombo and De Stefano, M, Geophysical modeling via simultaneous joint inversion of seismic, gravity, and electromagnetic data: application to prestack depth imaging, The Leading Edge (2007), 26, 326-331 use simultaneously the seismic and gravity or EM measurements to enhance the resolution of the structural inversion results.

The methods as described so far can be broadly categorized as iterative approaches. The second group of methods for solving inverse problems are often referred to as probabilistic or Bayesian approaches. Again there are numerous publications which present methods of the probabilistic or Bayesian approach. Details can be taken for example from the tutorial of K. Mosegaard and A. Tarantola, Probabilistic Approach to Inverse Problems, In: International Handbook of Earthquake and Engineering Seismology Volume 81A (2002) Appendix B9, 237-265, which covers solutions of the inversion problem for potential field data.

However in many cases the probabilistic approaches share the general weaknesses of ill-posed problems as described above. The information added in the inversion is often not sufficient to stabilize the solution and therefore joint inversion approaches are also not necessarily capable of producing a unique and acceptable solution.

In view of the known art, it is seen as an object of the invention to provide methods of solving the inverse problem, particularly for potential field related measurements, and thus improving the accuracy or reducing the uncertainty of the parameters derived from the solution.

SUMMARY OF INVENTION

According to an aspect of the present invention there is provided a method of simultaneously determining multiple parameters or a parameter distribution characterizing material properties of a volume under investigation using an inversion process of sparse measurements, including the step of defining an initial model of the volume and modifying the initial model by matching the multiple parameters or parameter distribution with the measurements using alternatingly an iterative inversion method and a probabilistic inversion method, and determining the multiple parameters or parameter distribution after one or more iterations of the alternating inversions.

The proposed invention aims at merging the iterative and the probabilistic approaches as described in order to combine their strengths and put their respective advantages together to better handle the non-uniqueness challenge resulting in a satisfactory reconstructed model. This approach is seen not only as helpful to overcome the non-uniqueness and instability of the solution but also to reduce the computational cost that may be extremely high, particularly for non-linear inverse problems The methods proposed herein include two iterative steps embedded with a global loop. Each step performs the inversion process using either the iterative or probabilistic method. The two steps are linked with the starting model of one method being a transformed final model as gained from the previous run the other model. Thus the input or starting model of the probabilistic approach is preferably provided by a pseudo-converged model as resulting from a predefined number of iterative steps or after reaching a convergence criterion. The probabilistic inversion is best performed for a predefined number of samplings and the pseudo-converged model can then be used as the input or starting model for the next run of the global iteration.

The above two-step process is preferably repeated as global iteration until both methods converge, after each method reaching its own convergence criteria. According to a preferred variant of the invention, the convergence criterion for the probabilistic inversion is tested after its transformation into a starting model for the iterative method but before entering the iterative method.

Further details, examples and aspects of the invention will be described below referring to the following drawing.

BRIEF DESCRIPTION OF THE FIGURES

FIG. 1 illustrates steps in accordance with an example of the invention.

DETAILED DESCRIPTION

The proposed approach uses both the iterative and the probabilistic treatment of the inverse problem. Both methods are combined quasi-simultaneously or sequentially in order to merge their respective strengths and therefore enhance the effectiveness in determining parameters through inversion.

The example below starts with an iterative method and is then switched to a probabilistic method. It should however become clear from the description below that this particular sequence of methods can be reversed. To improve the results the alternating application of both methods is repeated in further global iterations of the method.

The model m to be identified belongs to the set of real numbers $R^M$. In this example the inverse problem is assumed to be discrete in space and divided into pixels so the dimension M of the model space is usually a multiple of the number of pixels. However as a solution to the iterative and probabilistic inverse methods exist for continuous functions the following example can be modified appropriately, should the inverse problem be defined as a continuous function.

Starting with the iterative part of the example, reference can be made to Oldenburg and Li above to provide further details. The iterative approach minimizes an objective function which is a sum of a L2-norm data misfit function and a L2-norm regularization function—the latter is used to regularize and to stabilize the problem. The function corresponding to the iterative method can be described by:

$$\phi(m) = \phi_d(m) + \lambda \phi_m(m), \quad [1]$$

where $\phi_d(m)$ is the data misfit function to compute the misfit between observed data d and the computed data as determined by the gravity forward model. Taking for example the response to a gravity survey, the forward modeling system is a density distribution ρ and the model used to calculate the data from the density distribution of the model is based on Newton's law of gravity:

$$g_z = G \int_\Omega \frac{\rho}{r^2} d\Omega \quad [2]$$

resulting in the data mismatch function:

$$\phi_d(m) = \|d - g_z(\text{comp})\|^2. \quad [3]$$

The second function $\phi_m(m)$ of eq. [1] is a regularization function that reduces the nonuniqueness and provides more physical relevant and stable solutions within the framework of an ill-posed problem. The parameter λ is a Lagrange multiplier which determines the trade-off between the data misfit and the regularization or model objective function. This model objective function can be expressed for example as:

$$\phi_m(m) = \alpha_s \int_V (w(r)(m(r) - m_{ref}))^2 dV + \sum_{k=x,y,z} \alpha_k \int_V \frac{\partial}{\partial k} (w(r)(m(r) - m_{ref}))^2 dV, \quad [4]$$

where m(r) is the sought model and $m_{ref}$ is the reference model, with w(r) being a weighting function. This particular regularization incorporates the reference model $m_{ref}$ and derivatives of the model in its three spatial directions in order to penalize structure changes. It also includes the appropriate weighting function depending on a distance parameter r needed for each type of potential field data (surface or subsurface) to avoid the lack of the susceptibility of the kernel's decay with distance or depth r.

The model objective function of eq. [4] dampens the solution of an ill-pose problem and gives weight to the a-priori model $m_{ref}$. It is independent of the data and includes only the model m(r) and the a priori model $m_{ref}$. Treating r as a vector r should indicate that the problem is typically multi-dimensional. In the case of a borehole gravity measurement, the vector r can for example represent two- or three-dimensional space coordinates. The model $m_{ref}$ can be used to capture all prior knowledge of the density distribution in the volume V.

The iterative algorithm used to minimize the objective function [1] is based on the descent theory in which the gradient of the function is required. The step-length of the descent direction is computed using line-search algorithm in order to speed-up the minimization process. All these steps are well known and described in some of the above-cited references and other textbooks well-known in the art.

The probabilistic treatment of (geophysical) inversion is for example described in the work of Mosegaard et al. (2002). As far as detailed steps of the probabilistic method are concerned, such steps are described in Mosegaard and other publications well-known in the art. For that reason the following example is restricted to an outline and refers only to particular features of interest.

For the probabilistic step a posterior probability distribution σ(m) of model m (the model to be estimated) is given by the conjecture of two kinds of information: the observed data and a priori information about the model. The conjecture is defined in a combined data D and model M space M×D as $$\sigma_M(m) = \int_D \sigma(d,m) dd = \rho_M(m) \cdot L_D(m), \quad [5]$$

where M and D are model and data parameter spaces, respectively, and $\rho_m$ is the probability distribution that represents the prior information about model to be identified and the function $L_D$ represents the likelihood function which measures the misfit between the observed data d and the computed data.

In the example $\rho_M$ can be defined as a Gaussian distribution represented by:

$$\rho_M \sim N(m_{ref}, C_M) \text{ or}$$

$$\rho_M(m) = k \exp(\phi_m(m)) \text{ or}$$

$$\rho_M(m) = k \exp((m_{ref} - m) C_M^{-1} (m_{ref} - m)), \quad [6]$$

where $C_M$ is a matrix model which gives an uncertainty around the a-priori model.

The function $L_D$ in eq. [5] represents the likelihood function which measures the misfit between the observed data d and the computed data $g_z(m)$ as being computed using the gravity forward model based on the Newton's law (eq. [2]). The data uncertainties are described in this example by a Gaussian distribution with $C_D$ being a matrix which quantifies the data uncertainties. An example of the distribution function $L_D$ can thus be defined as:

$$L_D(m) \sim N(d, C_D) \text{ or}$$

$$L_D(m) = k \exp(\phi_d(m)) \text{ or}$$

$$L_D(m) = k \exp((g_z(m) - d) C_D^{-1} (g_z(m) - d)), \quad [7]$$

As mentioned above, the prior distribution allows introducing physical knowledge about the density distribution in the formation. The prior information might be given, for example, by data on the volume of injected water in the reservoir. This volume can be assumed to be known from the injector well histories. The water moving through the reservoir depends on the petrophysical properties of the formation. Thus the information can be represented by the scalar expression $$V_m(m) = m(1 - S_{hr}) \phi v, \quad [8]$$

where m is the density model of the subterranean formation and v, $S_{hr}$ and $\phi$ are the volume, the average residual hydrocarbon saturation and the average porosity of each cell of the density model, respectively.

The determination of the volume itself is contaminated by a Gaussian noise with a standard deviation, $\sigma_{Vol}$. The model covariance value is thus described by $$C_M = \sigma_{Vol}^2. \quad [9]$$

The description of $\rho_M$, after taking into account the volume of injected water and its uncertainty, might be expressed as:

$$\rho(m) = k \exp[(V_{injected}(m_{ref}) - V_m(m)) C_M^{-1} (V_{injected}(m_{ref}) - V_m(m))] \quad [10]$$

$$= k \exp\left[\frac{((V_{injected}(m_{ref}) - V_m(m))^2}{\sigma_{Vol}^2}\right]$$

Many algorithms were developed to solve a probabilistic approach as represented by eq. [5]. The solution is a posterior distribution which represents the model that maximizes the posterior probability $\sigma_M$. The M-size model m produced here is a distribution in R.

The two approaches as presented above are in principle well known. When assessing the differences between the two methods, the iterative minimization algorithm can be regarded as more efficient as per its performance to handle the computational cost. However, to perform the iterative algorithm effectively a starting model has to be carefully selected in order to avoid providing a wrong solution that corresponds to a local but not necessarily to the global minimum of the objective function. To avoid such a weak minimum solution the conditioning of the problem has to be enhanced.

The computational costs are the main weakness of the probabilistic method, particularly when the dimension M of the model space is high. But while the iterative minimization method explores only a small region of the model space, the probabilistic approach samples the complete model space and is not limited by local optima and multiple solutions.

The present invention recognizes that both approaches can be combined to at least partly remove the weaknesses each approach has when performed separately. Hence the following description refers to an exemplary way of combining the two methods within a single optimization process.

The FIG. 1 introduces the flow chart of steps of the proposed approach. The Method A is chosen to denote the iterative algorithm and the Method B the probabilistic one. The order of the algorithm may be modified and this invention does not have any restriction regarding the rank of the two methods. Moreover, some of the steps as illustrated in FIG. 1 are optional steps to improve the performance of the method but may be omitted by the operator.

The steps as proposed are:

Step 1: Perform a potential field survey from sensor locations around or within the tested volume. In case of a reservoir survey, the locations may be at surface, along one or multi wellbores, or both. Potential field surveys can be based on gravity and/or electromagnetic field effects.

Step 2: Select an initial guess of the model to be inverted.

Step 3: Run Method A: update the estimated model $m_{i=1}^{k=1}$ (A) using the iterative algorithm until the number of iterations I reaches number p. This step is the start of the first super-iteration k=1. The number p of iterative updates and the number of sampling q for the probabilistic algorithm for Method B below are pre-defined (Steps 4 and 7). These numbers are introduced to achieve a (pseudo-)convergence of the overall inversion process at each step but they do not represent the number needed for final convergence of the process. In other word, the defined numbers p and q are only needed to stop the current method and switch to the other method. As alternative to a fixed number of steps a first convergence criteria can be applied to trigger the switch from Method A to Method B such as:

$$\|m_i(A) - m_{i-1}(A)\| < tol \quad [11]$$

Step 5: Transform the pseudo-converged model after the iteration k=1 $m_{i=p}^{k=1}$(A) obtained from the iterative Method A to an input model $m_{j=1}^{k=1}$(B) for the probabilistic Method B. In the case of the gravity measurement, this step transfers a density distribution to Method B.

Step 6: Run the probabilistic Method B starting from the input model $m_{j=1}^{k=1}$(B). Generate an estimated model $m_{j=q}^{k=1}$(B) after q-samplings (Step 7).

Step 8: The pseudo-converged model $m_{j=q}^{k=1}(B)$ will be used as initial guess $m_{i=1}^{k=2}(A)$ n Step of next super-iteration. The model $m_{j=q}^{k=1}(B)$ of the first iteration k=1 of Method B is transformed into a Method A model $m_{i=1}^{k=2}(A)$ for the second (k=2) iteration of iterative Method A by computing the probability distribution function at the model $m_{j=q}^{k=1}(B)$ and selecting as $m_{i=1}^{k=2}(A)$ the model corresponding to the maximum magnitude of the distribution function. Other selection criteria for the most likely model may be chosen at this step. This step marks the end of the first super-iteration k=1.

Step 9: Repeat the super-iteration process (Step 3 to Step 8 included) n times until both algorithms converge appropriately. The convergence is obtained in this example only if the residual norm of successive values of the generated model m(A) and the residual norm of successive distributions of the generated model m(B) satisfy the threshold conditions $tol_1$ and $tol_2$, respectively. The residual norm of successive distributions of produced model m(B) is tested after its transformation into a model m(A), i.e., after Step 8. Though both conditions are independent from each other, their numerical value can be the same. Other criteria to end the super-iteration process can be chosen. The number n of super iteration can vary widely but is expected to range from 5 to 100 or mostly from 10 to 50.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative processes, one skilled in the art will recognize that the methods may be embodied using a variety of specific procedures and equipment and could be performed to evaluate widely different types of applications and measurements. Accordingly, the invention should not be viewed as limited except by the scope of the appended claims.

What is claimed is:

1. A method of simultaneously determining multiple parameters or a parameter distribution characterizing material properties of a volume of a subterranean formation under investigation using an inversion process of sparse measurements, the method comprising:
    performing a potential field survey of the volume of the subterranean formation using sensors located around or within the volume;
    defining a model of said volume and modifying said model by matching said multiple parameters or parameter distribution characterizing material properties with said measurements of the effects of the potential field using alternatingly an iterative inversion method and a probabilistic inversion method; and
    determining said multiple parameters or parameter distribution characterizing material properties after one or more iterations of said alternating inversions wherein a pseudo-converged model obtained after one or more iterations of an inversion is transformed and the transformed model of the inversion is used as an input model for a successive inversion.

2. The method of claim 1, wherein after a probabilistic inversion, a most probable model of the probabilistic inversion is transformed and used as a starting model for the iterative inversion.

3. The method of claim 2, wherein the most probable model is selected as the model having the maximum probability.

4. The method of claim 1, wherein a first switching condition is associated with the iterative inversion method to switch to the probabilistic inversion method and a second switching condition is associated with said probabilistic inversion method to switch to said iterative inversion method.

5. The method of claim 1, wherein the iterations are terminated when a first termination condition is satisfied after the iterative inversion method and a second termination condition is satisfied after the probabilistic inversion method within one iteration of the alternating iterations.

6. The method of claim 1, wherein the number of iterations of said alternating inversions exceeds 4.

7. The method of claim 1, wherein the number of iterations of said alternating inversions exceeds 9.

8. The method of claim 1, wherein the alternating inversions continue until both the iterative inversion method and the probabilistic inversion method converge.

* * * * *